US009883285B1

(12) United States Patent
Butler et al.

(10) Patent No.: US 9,883,285 B1
(45) Date of Patent: Jan. 30, 2018

(54) SOUND QUALITY DEVICE AND SYSTEM

(71) Applicant: RevX Technologies, Inc., Austin, TX (US)

(72) Inventors: Michael Brett Butler, Austin, TX (US); Dennis Rauschmayer, Plano, TX (US); Bryan Ross Anderton, Austin, TX (US)

(73) Assignee: RevX Technologies, Austin, TX (US)

( * ) Notice: Subject to any disclaimer, the term of this patent is extended or adjusted under 35 U.S.C. 154(b) by 41 days.

(21) Appl. No.: 14/580,424

(22) Filed: Dec. 23, 2014

(51) Int. Cl.
*H04B 15/00* (2006.01)
*H04R 3/02* (2006.01)
*H04R 3/00* (2006.01)
*H04R 25/00* (2006.01)

(52) U.S. Cl.
CPC ............... *H04R 3/02* (2013.01); *H04R 3/002* (2013.01); *H04R 25/453* (2013.01)

(58) Field of Classification Search
CPC ......... H04R 3/02; H04R 3/002; H04R 25/453
See application file for complete search history.

(56) References Cited

U.S. PATENT DOCUMENTS 4,177,431 A 4/1979 Polk, Jr.
5,197,102 A * 3/1993 Sondermeyer ........... H04R 3/00 330/109
5,937,072 A 8/1999 Combest
5,956,410 A * 9/1999 Brisson .................. H04B 15/00 330/149
8,254,601 B2 * 8/2012 Feldstein ................. H04R 3/00 333/17.3
9,247,340 B2 * 1/2016 Powell ..................... H04R 3/00
2008/0069368 A1 * 3/2008 Shumard ............ G10K 11/1788 381/71.6
2008/0112573 A1 * 5/2008 Huang ................... H04R 27/00 381/86
2009/0153243 A1 6/2009 Tsukamoto
2014/0219480 A1 8/2014 Collins

FOREIGN PATENT DOCUMENTS

JP 59061208 4/1984
WO WO2014186613 11/2014

OTHER PUBLICATIONS

Mrad, et al., "Integrated Class-D Audio Amplifer Virtual Test for Output EMI Filter Performance", Proceedings of the 2013 9th Conference on Ph.D. Research in Microelectronics and Electronics (Prime), IEEE, Jun. 24, 2013, pp. 73-76 (4 pages).
PCT Search Report and Written Opinion dated Jan. 20, 2016 for PCT application No. PCT/US2015/058590 (13 pages).
PCT/US2015/058590 International Preliminary Report on Patentability date Jul. 6, 2017 (2 pages).

* cited by examiner

*Primary Examiner* — Andrew L Sniezek
(74) *Attorney, Agent, or Firm* — Lee & Hayes, PLLC

(57) ABSTRACT

Devices for improving the quality of sound output by a speaker. For example, the device may act to remove ultrasonic frequencies from an audio signal prior to the audio signal being output by a speaker. In other examples, the device may act to impede the progress of harmonic distortion, intermodulation distortion, and environmental noise feeding back into the source device.

20 Claims, 7 Drawing Sheets

700

| 702: Frequency (Hz) | 704: THD% without a Sound Quality Device | 706: THD% With Sound Quality Device of FIG. 3 |
|---|---|---|
| 600 Hz | 0.261 | 0.214 |
| 800 Hz | 0.214 | 0.144 |
| 1000 Hz | 0.106 | 0.053 |
| 1200 Hz | 0.056 | 0.045 |
| 1400 Hz | 0.059 | 0.044 |

FIG. 7

SOUND QUALITY DEVICE AND SYSTEM

BACKGROUND

Speakers typically produce noise or distortion that may cause feedback into the device generating the sound signal as the speakers output the signal as sound. In some cases, this feedback may couple with the audio signal generated by the device degrading the quality of the overall signal. Additionally, some types of devices configured to generate or magnify the sound signal, such as an amplifier, may introduce additional noise that may further degrade the quality of the signal.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 7 is an example table showing total percentage of harmonic distortion with and without use the sound quality device of FIG. 4.

DETAILED DESCRIPTION

Figure 1:
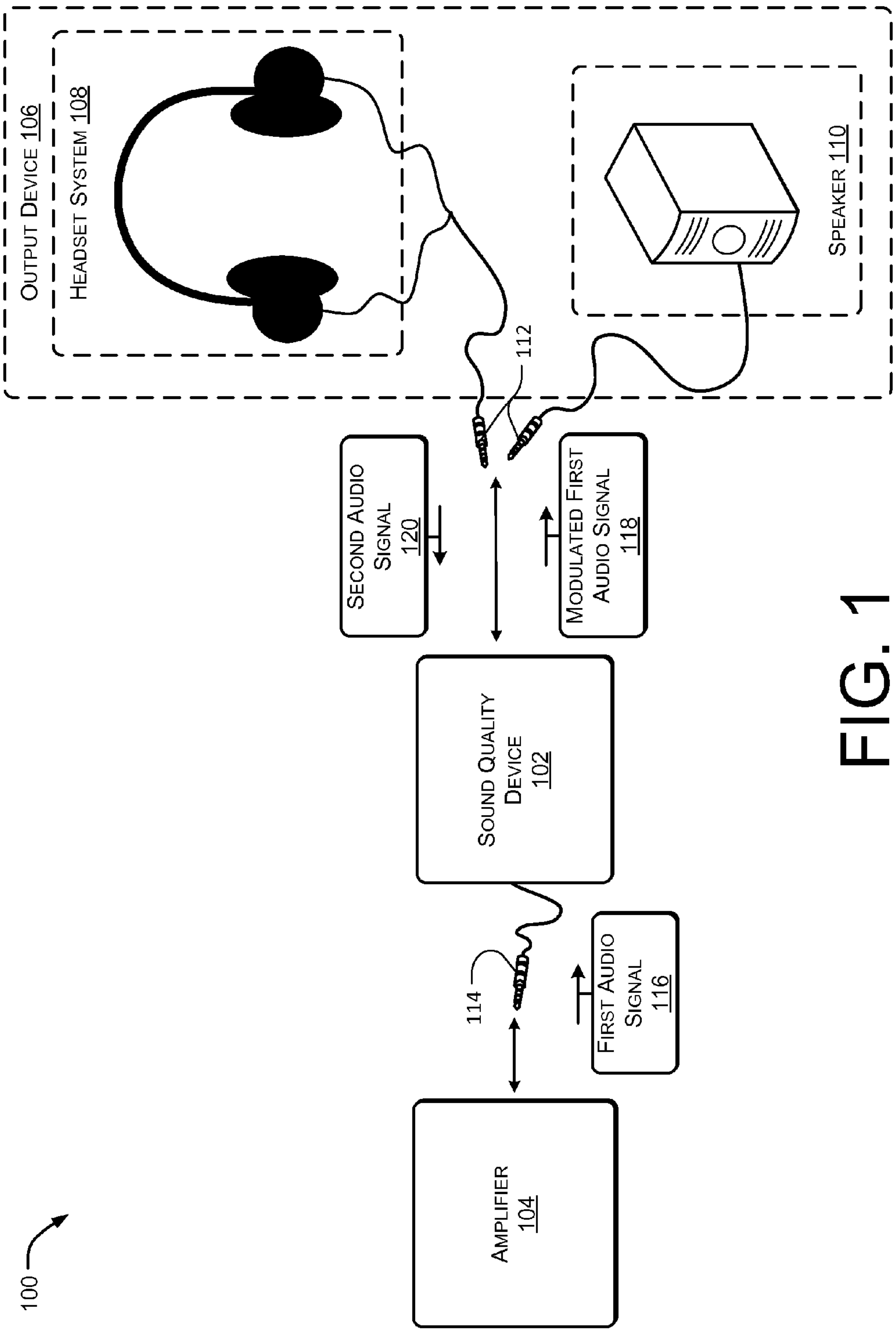
FIG. 1 illustrates an example system including a sound quality device according to some implementations.

This disclosure includes techniques and implementations to improve quality of sound output by speakers, in-ear monitors, or headsets. In particular, this disclosure describes ways to reduce noise or disturbances caused by the mechanical or magnetic coupling caused by speaker components. Additionally, the device may be configured to reduce noise, such as ultrasonic noise, that may be introduced by the use of an amplifier or other device to generate the audio signal prior to output by the speaker or headset. For instance, in some implementations described herein, a sound quality device may be configured to releasably couple between the amplifier (or a device generating the audio signal) and the speaker to modulate a first audio signal (e.g., the music or desired audio) traveling from the amplifier to the speaker, while preventing a second audio signal (e.g., distortion or feedback generated at the speaker) from traveling from the speaker to the amplifier.

In some cases, harmonic distortion may be generated by the mechanical or the magnetic components of the speaker as the audio signal is output as sound. For example, the magnetic components may generate frequencies or overtones that are not part of the original audio signal based on a position of the mechanical (or moving) components of the speaker in relation to the magnetic components. In some instances, the harmonic distortion may be output by the speakers or other output devices as a buzzing noise that becomes more prominent at higher decibel levels. In other cases, the speaker may also generate intermodulation distortion as the magnetic components interact with the mechanical components. The intermodulation distortion may present itself as a mixing of the original audio signal, which generates additional frequencies or sounds that are detectable by the human ear.

Additionally, in some situations, environmental noise may also be coupled with the audio signal as the speaker often acts, at least in part, as a microphone. For example, the in-ear monitors worn by musicians when on stage to attenuate the volume of the music and protect the musician's ears often acts as microphone that detects and transfers environmental sound (e.g., stage and audience noise) back into the amplifiers, which may then be coupled into the audio signal.

In general, one or more of the harmonic distortion, the intermodulation distortion, and/or the environmental noise may be coupled back to the amplifier as feedback. In some cases, the amplifier may incorporate the feedback into the audio signal as the audio signal is passed to the speaker. The speaker in turn generates sound based on the audio signal including the frequencies associated with the feedback, thereby reducing the quality of the sound generated or causing the output of frequencies that are not part of the original audio signal.

In other situations, the amplifier itself may reduce the quality of the sound generated by the speaker. For example, some types of amplifiers, such as electronic amplifier, generate ultrasonic noise. While ultrasonic noise may not be directly detectable by the human ear, the ultrasonic noise may cause the driver of the speaker to vibrate at the ultrasonic frequencies and couple with the magnetic components of the speaker to introduce irregularities in the sound output by the speaker within the frequencies detectable by the human ear. In some cases, the ultrasonic noise within the audio signal also increases the rate at which the speaker generates harmonic and intermodulation distortion and thereby degrades the sound quality as discussed above.

Therefore, in some implementations, a sound quality device that may releasably couple between the amplifier and the speaker to impede the feedback of the harmonic distortion, the intermodulation distortion, and the environmental noise in one direction, while filtering the audio signal to remove or reduce the ultrasonic noise in a second direction. For example, the sound quality device may include one or more inductors placed in the channel of the right audio signal and the channel of the left audio signal to impede the flow of the harmonic distortion, the intermodulation distortion, and the environmental noise from the speaker to the amplifier. In some cases, the inductive value(s) of the one or more inductors are selected based in part on an impedance value of the speaker. For example, the value may be selected to provide 10 dB of harmonic distortion improvement at 10 kHz with the value being selected either through experimentation of simulation or calculation. In other examples, the sound quality device may include one or more pass gates to filter the ultrasonic noise as the audio signal passes through the sound quality device from the amplifier to the speaker.

In one particular example, the sound quality device may include multiple inductors, resistors, and capacitors arranged to filter a first audio signal traveling in a first direction, while preventing a second audio signal from traveling in a second direction. In some examples, the sound quality device may include a first set of multiple inductors, resistors, and capacitors arranged to filter a right audio signal traveling in a first direction and second set of multiple inductors, resistors, and capacitors arranged to filter a left audio signal traveling in a first direction, while preventing a feedback signal from traveling in a second direction.

As discussed above, the sound quality device may be a separate device that may be releasably coupled to the amplifier and/or the speaker, for example, via a tip sleeve ring (TSR) type connector, an audio connector such as a 3.5 mm jack, RCA type audio connectors, or other types of audio connectors. However, in some cases, the sound quality device may be configured as a circuit associated with the amplifier and/or as a circuit associated with the speaker.

FIG. 1 illustrates an example system 100 including a sound quality device 102 according to some implementations. In the illustrated example, the sound quality device 102 is shown as a separate device that may couple between an amplifier 104 and an output device 106, such as the headset 108 or the speaker 110. For example, the output device 106 may couple to the sound quality device 102 via a TSR or other type of audio input 112 and the sound quality device 102 may also couple to the amplifier 104 via a TSR or other type of audio input 114.

In some cases, the sound quality device 102 may include multiple inductors, resistors, and capacitors arranged to filter a first audio signal traveling in a first direction, while preventing a second audio signal from traveling in a second direction. In some examples, the sound quality device may include a first set of multiple inductors, resistors, and capacitors arranged to filter a right audio signal traveling in a first direction and second set of multiple inductors, resistors, and capacitors arranged to filter a left audio signal traveling in a first direction, while preventing a feedback signal from traveling in a second direction.

In the illustrated example, the amplifier 104 generates or outputs a first audio signal 116 that is received by the sound quality device 102. In some cases, the amplifier 104 may have introduced additional frequencies, such as the ultrasonic noise discussed above into the first audio signal 116. The sound quality device 102 may filter the first audio signal 116 to remove the high level frequencies or the ultrasonic noise introduced by the amplifier 104 to generate a modulated first audio signal 118. For example, the first audio signal 116 may be passed through one or more low pass filters, inductors, or resistors to remove the high frequency or ultrasonic noise. The modulated first audio signal 118 is then provided to the output device 106 for reproduction as sound.

The modulated first audio signal 118 is output by the output device 106 as sound. However, since the ultrasonic noise was removed from the first audio signal 116 by the sound quality device 102, the ultrasonic noise is not present in the modulated first audio signal 118 and is thereby prevented from coupling into the audio frequencies and/or from generating harmonic distortions and/or intermodulation distortions.

As the output device 106 converts the modulated first audio signal 118 into sound, the output device 106 generates harmonic distortions and intermodulation distortions, as described above. The output device 106 also captures environmental noise. The harmonic distortions, intermodulation distortions, and environmental noise may then travel back into the sound quality device 102 as the second audio signal 120. In some examples, the sound quality device 102 may include a high value inductor placed in the channel of the second audio signal 120 to impede the second audio signal

120 from reaching the amplifier 104. In some cases, the inductor's value may be selected based in part on the impedance value of the output device 106.

In some particular examples, the sound quality device 102 may include a circuit having a first inductor with a first electrode coupled to a first electrode of a second inductor and a first electrode of a first resistor. The second inductor may have a second electrode coupled to a first electrode of a third inductor and a first electrode of a second resistor. The first resistor may have a second electrode coupled to a first electrode of a first capacitor. The first capacitor may have a second electrode coupled to ground. The second resistor may have a second electrode coupled to a first electrode of a second capacitor. The second capacitor may have a second electrode coupled to ground. In some examples, the circuit describe above may be duplicated, for example, when the right audio and left audio signals are provided along separate channels. In these examples, the circuit described above may be tailored to resist the feedback caused by the speaker by selecting inductors, resistors, and capacitors with various values based in part on the impedance value associated with the output device 106.

Figure 2:
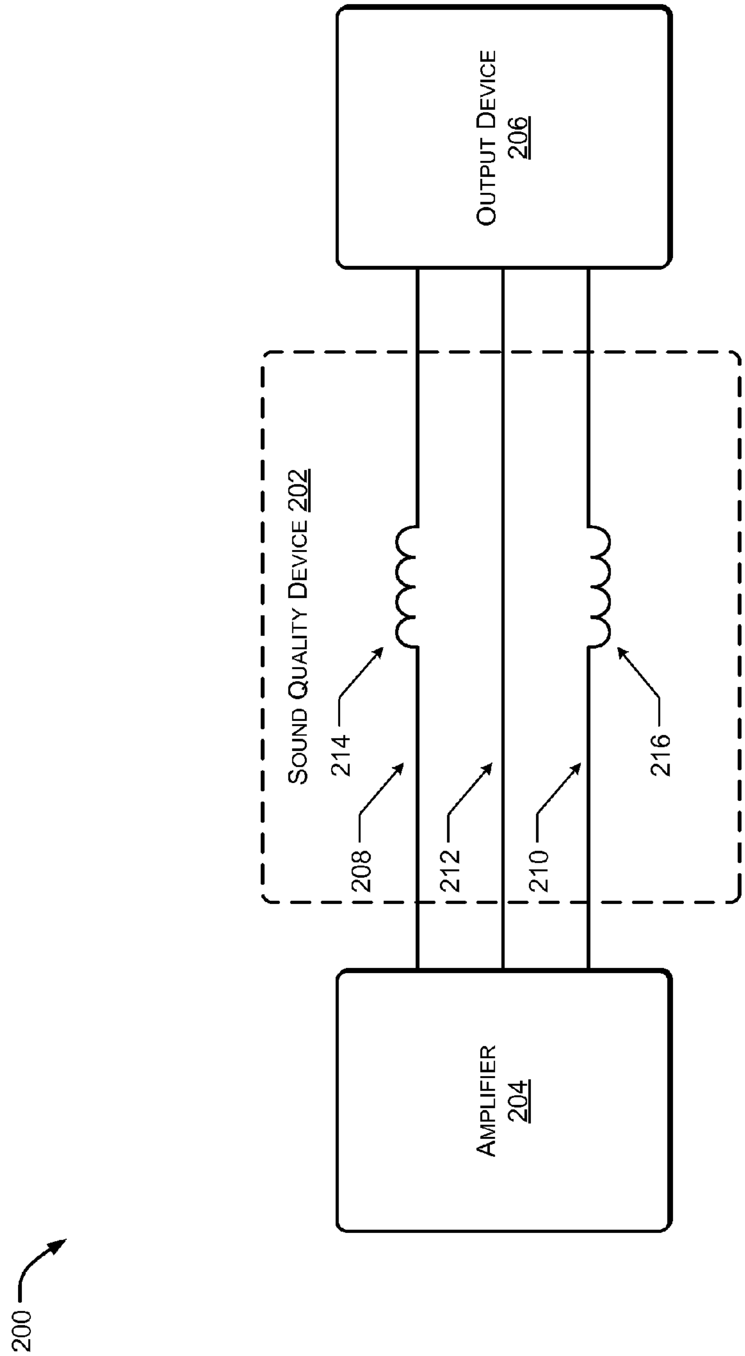
FIG. 2 illustrates a partial circuit diagram showing select components of a sound quality device of a system according to some implementations.

FIG. 2 illustrates a partial circuit diagram showing select components of a sound quality device 202 of a system 200 according to some implementations. In the illustrated example, the sound quality device 202 is coupled to an amplifier 204 and the output device 206 and includes, in part, a left audio channel 208, a right audio channel 210, and a ground 212. At least one inductor 212 may be incorporated into the left audio channel 208 and at least one inductor 214 may be incorporated into the right audio channel 210. The inductors 212 and 214 may be configured to act as a low pass filter in a first direction (e.g., as the audio signal moves from the amplifier to the output device), while impeding noise or disturbances from flowing back in a second direction from the output device to the amplifier. In some cases, the inductive value of each of the inductors 212 and 214 may be selected based at least in part on an impedance value associated with the output device. Thus, in some instances, the sound quality device 202 may be matched or selected based on the type and capabilities of the output device 206.

In one example, each of the inductors 212 and 214 may be coupled with the impedance of the output device causes the inductors 212 and 214 to act as a low pass filter to remove the ultrasonic noise from the audio signal generated by the amplifier. Additionally, the inductors 212 and 214 may have an inductance large enough to impede the distortion and other noise generated at the out device and, thereby to prevent the distortion and other noise from reaching the amplifier. It should be understood, that as the inductive value is increased the frequency value passed from the amplifier to the output device is lowered, while the amount of distortion rejection is improved.

In the illustrated example, the sound quality device 202 is shown as coupled to the amplifier 204 and the output device 206 as part of a single device. However, in other examples, the sound quality device 202 may be releasable from the amplifier 204 and/or the output device 206. For example, the sound quality device 202 may be a separate device from the amplifier 204 and the output device 206, incorporated into the amplifier 204 but separate from the output device 206, or incorporated into the output device 206 but separate from the amplifier 204.

Figure 3:
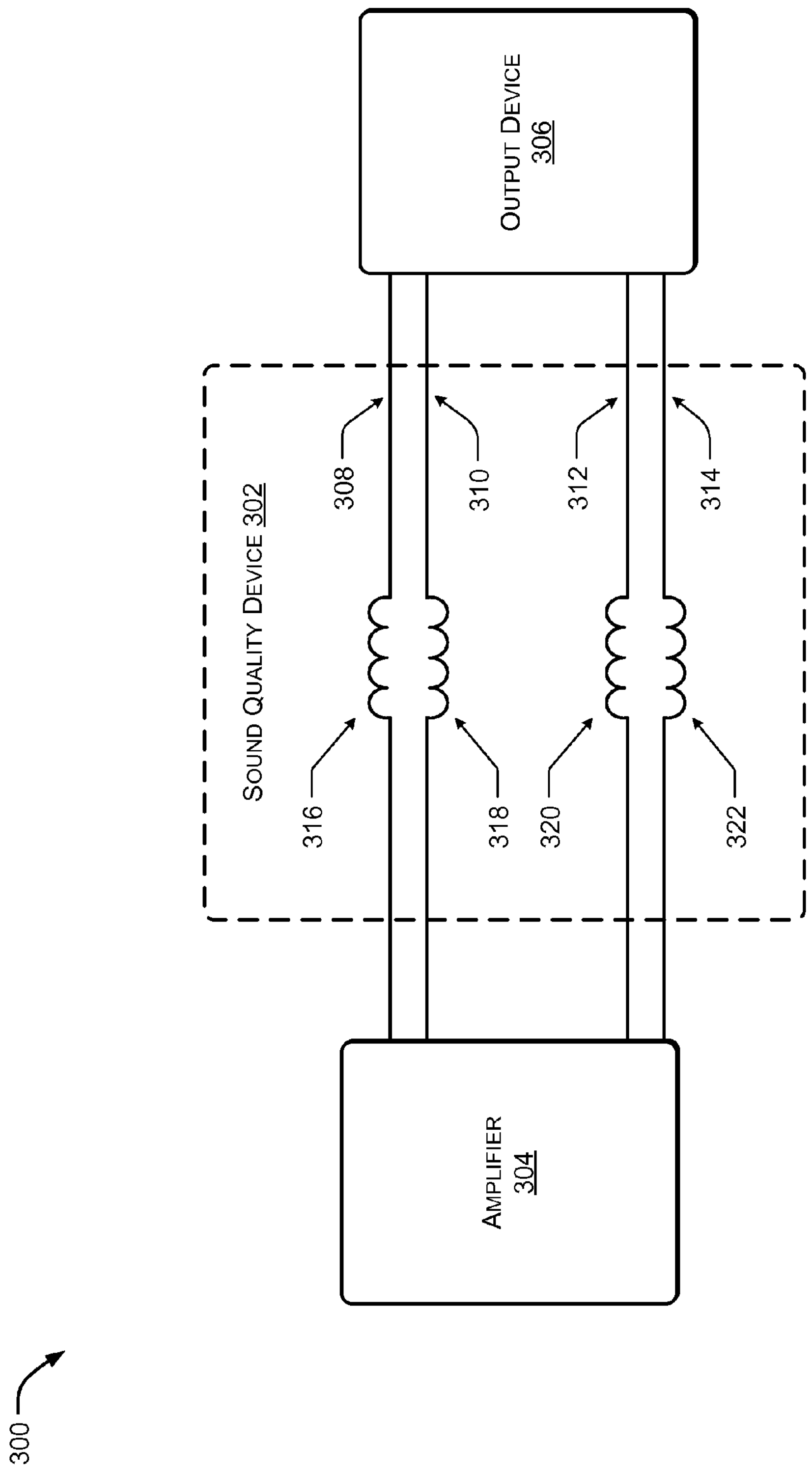
FIG. 3 illustrates a partial circuit diagram showing select components of a sound quality device of a system according to some implementations.

FIG. 3 illustrates a partial circuit diagram showing select components of a sound quality device 302 of a system 300 according to some implementations. For example, in some cases, the output device 302 may be coupled to an amplifier

304 and an output device 306, as described above. In some cases, the sound quality device 302 may be configured to receive a differential signal for the left audio and a differential signal for the right audio. In this example, channels 308 and 310 are configured to deliver a left audio signal from an amplifier to an output device and channels 312 and 314 are configured to deliver a right audio signal from the amplifier to the output device. In this example, each of the channels 308-312 include at least one inductor, generally indicated by 316, 318, 320, and 322.

In the current example, the inductive value of each of the inductors 316-322 may again be selected based in part on the impedance value associated with the output device. However, unlike the partial circuit diagram of FIG. 2, the inductive value of each of the inductors 312-322 may be halved from the single ended audio implementation. In this case, the pairs of inductors 316 and 318 as well as 320 and 322 couple with the impedance value associated with the output device to act as a low pass filter to remove ultrasonic frequencies from the audio signal generated at the amplifier. The pairs of inductors 316 and 318, as well as 320 and 322 also couple with the impedance of the output device to prevent the disturbances and other noise generated at or by the output device from feeding back into the amplifier, thereby further improving the sound quality associated with the audio signal and/or the output device. When qualitatively tested, test subjects reported that the audio listening experience is improved when using the sound quality device and the resulting audio was clearer, smoother and less fatiguing compared to listening without the audio quality device.

In the illustrated example, the sound quality device 302 is shown as coupled to the amplifier 304 and the output device 306 as part of a single device. However, in other examples, the sound quality device 302 may be releasable from the amplifier 204 and/or the output device 306. For example, the sound quality device 302 may be a separate device from the amplifier 304 and the output device 306, incorporated into the amplifier 304 but separate from the output device 306, or incorporated into the output device 306 but separate from the amplifier 304.

Figure 4:
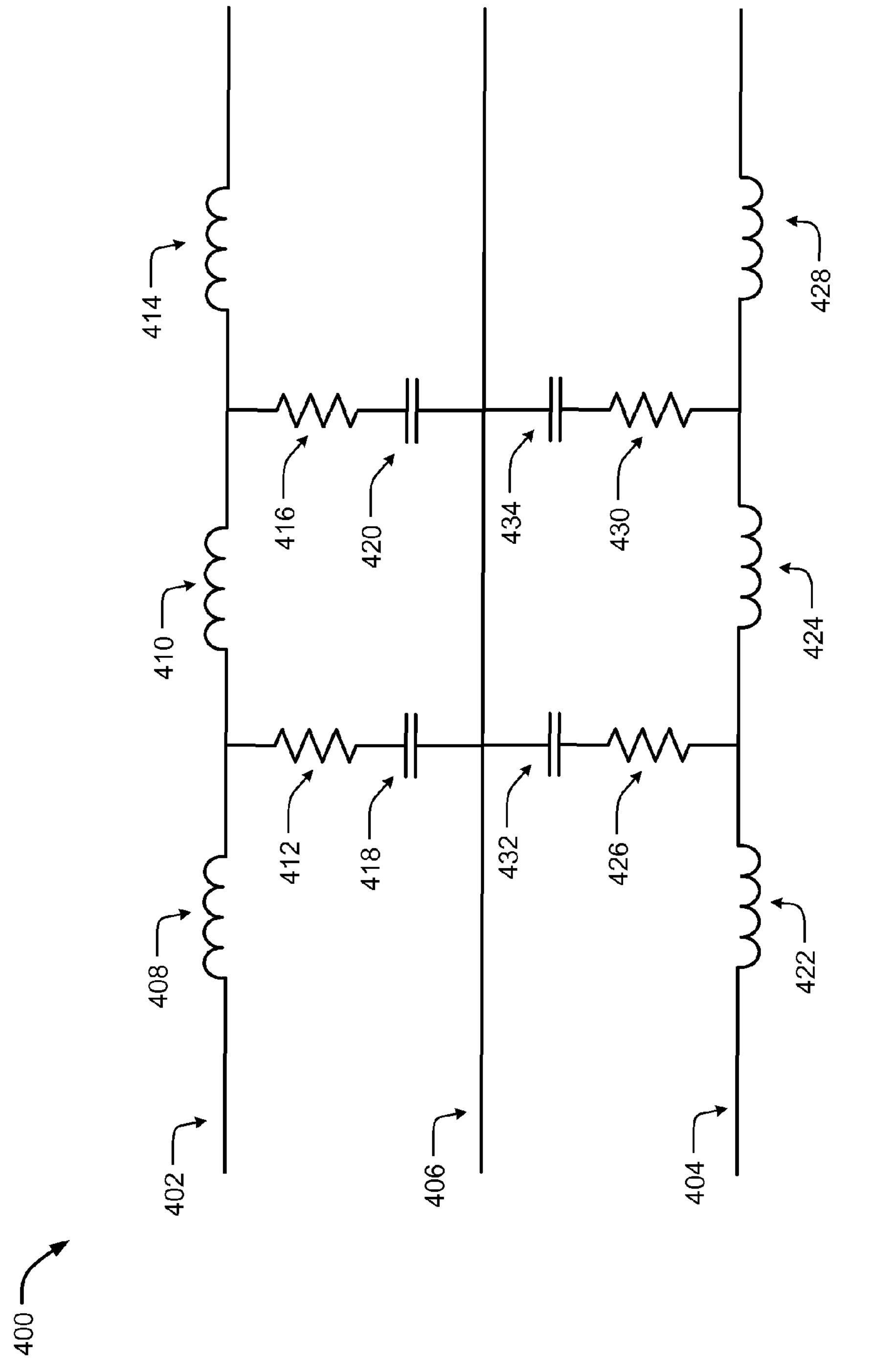
FIG. 4 illustrates a partial circuit diagram showing select components of a sound quality device according to some implementations.

FIG. 4 illustrates a partial circuit diagram showing select components of a sound quality device 400 according to some implementations. In the illustrated example, the sound quality device 400 includes, in part, a left audio channel 402, a right audio channel 404, and a ground 406, as described above with respect to FIG. 2. For example, the sound quality device 400 may be configured to couple inline between an amplifier or other audio producing device and an output device or speaker. In some cases, the interface may be a TSR connector or other audio input that produces the left audio and right audio as separate signals, for instance to produce surround sound.

In the current example, the sound quality device 400 may include a first circuit associated with the left audio channel 402. The first circuit may include a first inductor 408 with a first electrode coupled to a first electrode of a second inductor 410 and a first electrode of a first resistor 412. The second inductor 410 may have a second electrode coupled to a first electrode of a third inductor 414 and a first electrode of a second resistor 416. The first resistor 412 may have a second electrode coupled to a first electrode of a first capacitor 418. The first capacitor 418 may have a second electrode coupled to ground 406. The second resistor 416 may have a second electrode coupled to a first electrode of a second capacitor 420. The second capacitor 420 may have a second electrode coupled to ground 406.

Similarly, the sound quality device 400 may include a second circuit associated with the right audio channel 404. The first circuit may include a first inductor 422 with a first electrode coupled to a first electrode of a second inductor 424 and a first electrode of a first resistor 426. The second inductor 422 may have a second electrode coupled to a first electrode of a third inductor 428 and a first electrode of a second resistor 430. The first resistor 426 may have a second electrode coupled to a first electrode of a first capacitor 432. The first capacitor 432 may have a second electrode coupled to ground 406. The second resistor 430 may have a second electrode coupled to a first electrode of a second capacitor 434. The second capacitor 434 may have a second electrode coupled to ground 406.

In the illustrated example, the inductors 408, 410, 414, 422, 424, and 428 and capacitors 418, 420, 432, and 434 may act to impede the distortion introduced by the output device and environmental noise captured by the output device from feeding back into the amplifier. The inductors 408, 410, 414, 422, 424, and 428 and capacitors 418, 420, 432, and 434 may also act to filter the ultrasonic frequencies from the audio signal generated by the amplifier. Similarly, the resistors 412, 416, 426, and 430 further aid in the attenuation of the distortion and noise feeding back from the output device. In some cases, the resistors 412, 416, 426, and 430 act to flatten the audio signal as the audio signal may be passed to the output device and, thereby to maintain the high end frequencies of the audio signal, while still cutting off the ultrasonic noise.

In some cases, the inductive value of the inductors 408, 410, 414, 422, 424, and 428 and the capacitors 418, 420, 432, and 434 may be selected based in part on the impedance of the output device and the cut off value desired (e.g., an upper most frequency associated with the audio signal and allowed to pass to the output device). For example, in some cases, the cut off value may be between about 17 kilohertz (kHz) and about 20 kHz.

Figure 5:
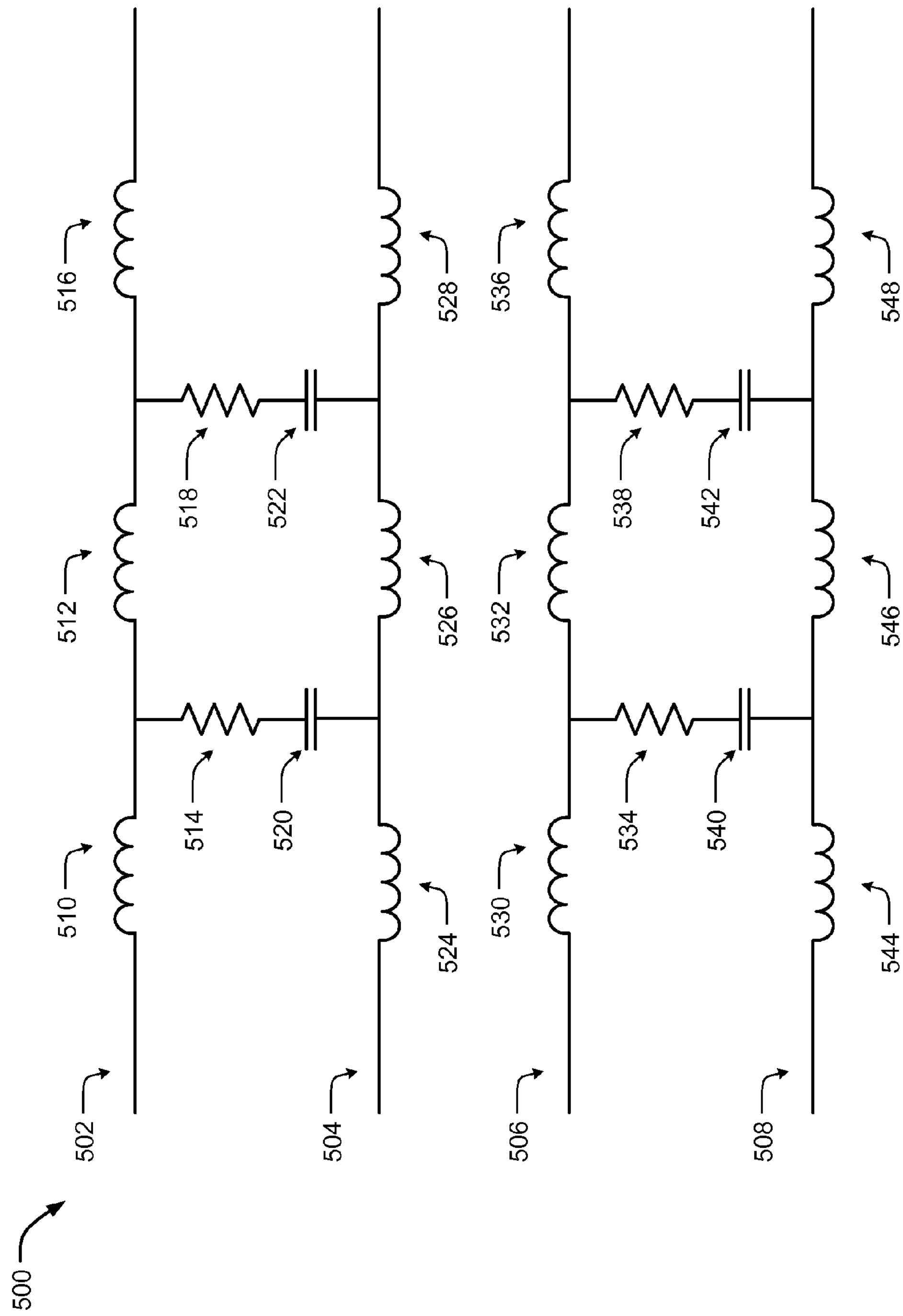
FIG. 5 illustrates a partial circuit diagram showing select components of a sound quality device according to some implementations.

FIG. 5 illustrates a partial circuit diagram showing select components of a sound quality device according to some implementations. In the illustrated example, the sound quality device 500 includes, in part, a differential left audio channel formed from channel 502 and 504 and a differential right audio channel formed from channels 506 and 508. For example, in some speaker types rather than the traditional single ended signal, a differential signal is used to generate both the right and left audio.

In the current example, the sound quality device 500 may include a first circuit associated with the left audio channels 502 and 504. For instance, the first circuit may include a first inductor 510 with a first electrode coupled to a first electrode of a second inductor 512 and a first electrode of a first resistor 514. The second inductor 512 may have a second electrode coupled to a first electrode of a third inductor 516 and a first electrode of a second resistor 518. The first resistor 514 may have a second electrode coupled to a first electrode of a first capacitor 520. The second resistor 518 may have a second electrode coupled to a first electrode of a second capacitor 522. The first capacitor 520 may have a second electrode coupled to a first electrode of a fourth inductor 524 and a first electrode of a fifth inductor 526. The second capacitor 522 may have a second electrode coupled to a second electrode of a fifth inductor 524 and a first electrode of a sixth inductor 528.

Similarly, the sound quality device 500 may include a second circuit associated with the right audio channels 506 and 508. For instance, the first circuit may include a first inductor 530 with a first electrode coupled to a first electrode of a second inductor 532 and a first electrode of a first resistor 534. The second inductor 532 may have a second electrode coupled to a first electrode of a third inductor 536 and a first electrode of a second resistor 538. The first resistor 534 may have a second electrode coupled to a first electrode of a first capacitor 540. The second resistor 538 may have a second electrode coupled to a first electrode of a second capacitor 542. The first capacitor 540 may have a second electrode coupled to a first electrode of a fourth inductor 544 and a first electrode of a fifth inductor 546. The second capacitor 542 may have a second electrode coupled to a second electrode of a fifth inductor 544 and a first electrode of a sixth inductor 548.

In the illustrated example, the inductors 510, 512, 516, 524, 526, and 528 associated with the left audio channels 502 and 504, as well as the inductors 530, 532, 536, 544, 546, and 548 associated with the right audio channels 506 and 508 may act to impede the distortion introduced by the output device and environmental noise captured by the output device from feeding back into the amplifier and to filter the ultrasonic frequencies from the audio signal generated by the amplifier. Similarly, the resistors 514, 518, 534, and 538 further aid in the attenuation of the distortion and noise feeding back from the output device. For example, the resistors 514, 518, 534, and 538 may provide a fixed resistance across all frequencies compared to the capacitors that have an impedance which reduces as frequency increases. Thus, the resistors 514, 518, 534, and 538 may generate an impedance floor. In some cases, the resistors 514, 518, 534, and 538 act to flatten the left and right audio signal as the audio signal is passed to the output device and thereby to maintain the high end frequencies of the audio signal, while still cutting off the ultrasonic noise.

In some cases, the inductive value of the inductors 510, 512, 516, 524, 526, and 528 as well as the capacitors 520 and 522 may be selected based in part on the impedance of the output device associated with the left audio and the cut off value desired (e.g., an upper most frequency associated with the audio signal and allowed to pass to the output device). Likewise, the inductive value of the inductors 530, 532, 536, 544, 546, and 548 as well as the capacitors 540 and 542 may be selected based in part on the impedance of the output device associated with the right audio and the cut off value desired (e.g., an upper most frequency associated with the audio signal and allowed to pass to the output device).

Figure 6:
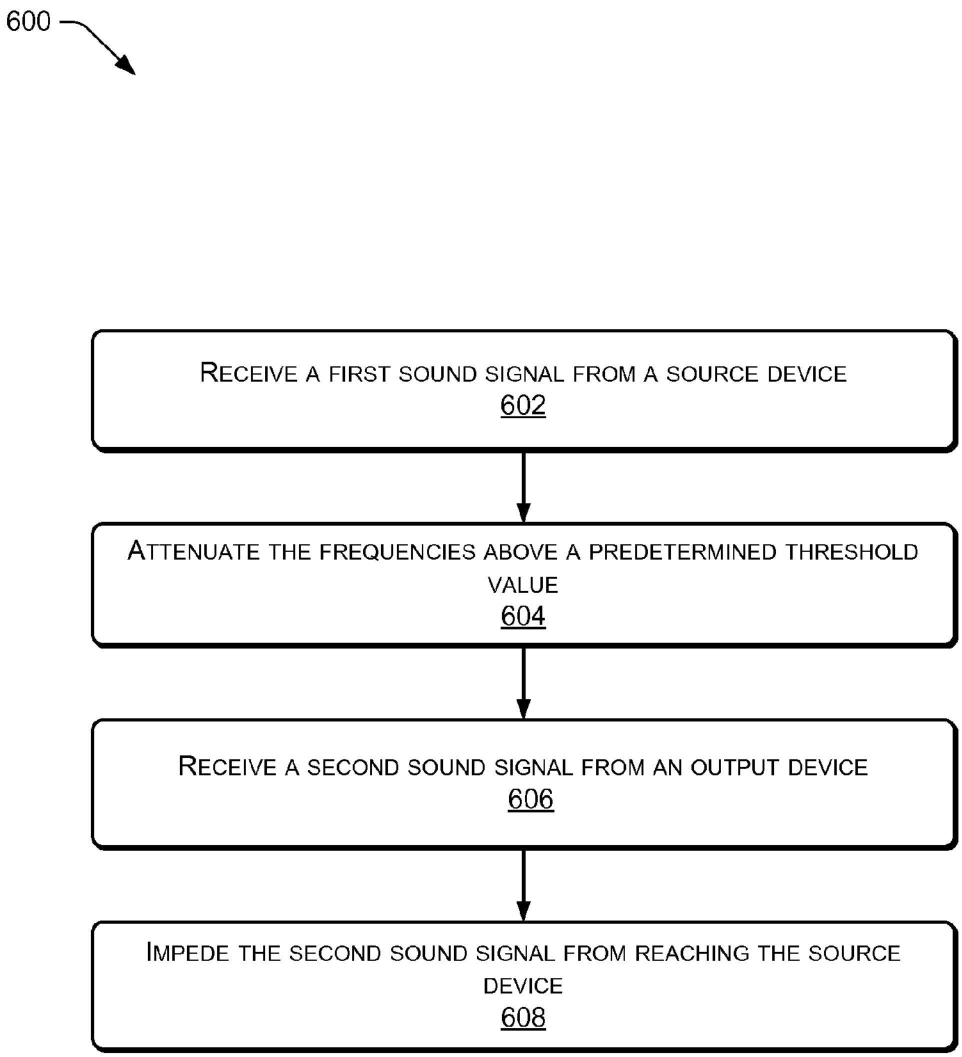
FIG. 6 is an example flow diagram showing an illustrative process according to some implementations.

FIG. 6 is a flow diagram illustrating example processes for improving the sound quality of an audio signal output by an output device. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 6 is example flow diagram showing an illustrative process 600 according to some implementations. For example, the process 600 may relate to a device, such as the sound quality devices of FIGS. 1-5, for preventing harmonic distortion, intermodulation distortion, and environmental noise from feeding back into a device generating the audio signal, such as an amplifier. For instance, as discussed above, harmonic distortion may be generated by the mechanical or the magnetic components of the output device or speaker as the audio signal is output as sound. For example, the magnetic components may generate frequencies or overtones that are not part of the original audio signal based on a position of the mechanical (or moving) components of the speaker in relation to the magnetic components. In some instances, the harmonic distortion may feedback into the amplifier, couple with the audio signal, and be reproduced as a buzzing noise at the output device.

The intermodulation distortion may also be generated at the output device, again as the magnetic components interact with the mechanical components. The intermodulation distortion may also feedback in to the amplifier, couple with the audio signal, and be reproduced by the output device a mixing of the original audio signal, which generates additional frequencies or sounds that are detectable by the human ear. The environmental noise is introduced into the system when the output device acts as a microphone and captures the sound in the environment, which may also feedback into the amplifier, mix with the audio signal, and may be reproduced by the output device.

In other situations, the process 600 may relate to reduction of interference introduced by the amplifier itself. For example, the amplifier may generate ultrasonic noise. While ultrasonic noise may not be directly detectable by the human ear, the ultrasonic noise may causes the driver of the output device to vibrate at the ultrasonic frequencies which may couple with the magnetic components of the output to introduce irregularities in the sound within frequencies detectable by the human ear. In some cases, the ultrasonic noise within the audio signal also increases the rate at which the speaker generates harmonic and intermodulation distortion and degrades the sound quality, as discussed above.

At 602, the sound quality device receives a first sound signal from a source device. For example, the sound quality device may receive the track or audio to be reproduced as sound by the output device. The source device may be an amplifier or other electronic device, such as a radio receiver or computing device. In some cases, the first audio signal may be traveling in a first direction (e.g., from the source device to the output device).

At 604, the sound quality device may attenuate frequencies above a predetermined threshold value. For example, the source device may have introduced ultrasonic noise, as described above. In this example, the sound quality device may be configured to remove frequencies above the predetermined threshold value to remove the ultrasonic noise, while still maintaining the high end frequencies of the audio or music. For instance, the predetermined value may be set between 17 kHz and 20 kHz.

At 606, the sound quality device receives a second sound signal from the output device. In some cases, the second sound signal may include one or more of the harmonic distortion, the intermodulation distortion, and environmental noise. For example, the output device may be a speaker or ear bud that includes both mechanical and/or magnetic components that act to introduce the harmonic distortion and the intermodulation distortion. The speaker may also act as a microphone to captures environmental noise. The distortions and noise may then feedback along the audio channel to the sound quality device as the second audio signal. Thus, in some cases, the second audio signal may be traveling in a second direction opposite the first direction (e.g., from the output device to the source device).

At 608, the sound quality device impedes the second sound signal from reaching the source device. For example, as described above, the feedback of the harmonic distortion, the intermodulation distortion, and environmental noise into the source device (such as an amplifier) may cause the coupling of the harmonic distortion, the intermodulation distortion, and environmental noise with the first audio signal as the first audio signal is provided to the output device, thereby causing the harmonic distortion, the intermodulation distortion, and environmental noise to be output as sound and degrading the quality of the first audio signal.

In some cases, the sound quality device may include an inductive component selected based in part on an impedance of the output device to cause the sound quality device to impede or prevent the second audio signal from traveling backwards down the audio channel or channels. In other cases, the sound quality device may also include a capacitive component in addition to the inductive component to further impede the second the progress of the second audio signal.

FIG. 7 is example table 700 showing total percentage of harmonic distortion (THD %) with and without use the sound quality device of FIG. 3. For instances, one test included generating a single tone audio signal, injecting the single tone audio signal into the system and allowing a speaker to generate the resulting audible tone. A microphone was used to record a resulting audio signal including the single tone audio signal and any distortion output by the speaker. The resulting audio signal was then analyzed to determine to resulting THD %. In the table 700, the first column 702 provides a list of sample frequencies at which the total harmonic distortion was collected. The second column 704 shows the percentage of harmonic distortion within the audio signal when no sound quality device is utilized. The third column 706 shows the percentage of harmonic distortion within the audio signal when the sound quality device described with respect to FIG. 4 is utilized.

As shown in the table 700, the total percentage of harmonic distortion is reduced within each frequency when the sound quality device is utilized. Additionally, the sound quality device removes more harmonic distortion in the lower frequencies (e.g., the frequencies at which typically more harmonic distortion is generated). For example, at 800 Hz the THD % without the sound quality device was 0.214 and with the sound quality device the THD % was reduced to 0.144. Additionally, at 1000 Hz the THD % without the sound quality device was 0.106 and with the sound quality device the THD % was reduced to 0.053, a fifty percent reduction.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A device comprising:

an input interface for releasably coupling to a first cable coupled to an amplifier, the input interface configured to receive an audio signal traveling in a first direction from the amplifier;

an output interface for releasably coupling to a second cable coupled to a speaker, wherein the device receives feedback generated at least in part by one or more components of a speaker traveling in a second direction opposite the first direction via the output interface; and a circuit coupled between the input interface and the output interface configured to remove frequencies from the audio signal above a predetermined threshold and to prevent the feedback from reaching the amplifier, the feedback including environmental noise captured by the speaker when operating as a microphone.

2. The device as recited in claim 1, wherein the feedback includes harmonic distortion.

3. The device as recited in claim 1, wherein the feedback includes intermodulation distortion.

4. The device as recited in claim 1, wherein the circuit has an inductance selected based in part on an impedance of the speaker.

5. The device as recited in claim 4, wherein the inductance of the circuit assists in preventing the feedback from reaching the amplifier.

6. The device as recited in claim 1, wherein the predetermined threshold is set based at least in part on frequency introduced into the audio signal by the amplifier.

7. The device as recited in claim 1, wherein the circuit includes:

a left audio channel to receive a first portion of the audio signal, the left audio channel including a first inductor having a first electrode coupled to a first electrode of a second inductor and a first electrode of a first resistor, the second inductor having a second electrode coupled to a first electrode of a third inductor and a first electrode of a second resistor, the first resistor having a second electrode coupled to a first electrode of a first capacitor, the first capacitor having a second electrode coupled to ground, the second resistor having a second electrode coupled to a first electrode of a second capacitor, the second capacitor having a second electrode coupled to the ground; and a right audio channel to receive a second portion of the audio signal, the right audio channel including a first inductor having a first electrode coupled to a first electrode of a second inductor and a first electrode of a first resistor, the second inductor having a second electrode coupled to a first electrode of a third inductor and a first electrode of a second resistor, the first resistor having a second electrode coupled to a first electrode of a first capacitor, the first capacitor having a second electrode coupled to the ground, the second resistor having a second electrode coupled to a first electrode of a second capacitor, the second capacitor having a second electrode coupled to the ground.

8. The device as recited in claim 1, wherein the predetermined threshold is greater than 17 kHz and less than 19 kHz.

9. A device comprising:

an first interface for releasably coupling to a source device, the first interface configured to receive a first signal from the source device;

an second interface for releasably coupling to an output device, the second interface configured to receive a second signal from the output device; and a circuit coupled between the first interface and the second interface, the circuit to impede the second signal from reaching the source device, the second signal including environmental noise captured by a mechanical or the magnetic component of the output device and the circuit including:

a left audio channel including at least one inductor;

a right audio channel including at least one inductor; and a resistive element and a capacitive element coupled between the right audio channel and the left audio channel.

10. The device as recited in claim 9, wherein the first signal is an audio signal.

11. The device as recited in claim 9, wherein the second signal also includes at least one of:

harmonic distortion; or intermodulation distortion.

12. The device as recited in claim 9, wherein the circuit is further configured to remove frequencies from the first signal above a predetermined threshold.

13. The device as recited in claim 9, wherein the first signal is a differential audio signal.

14. A device comprising:

a first interface for releasably coupling to a source device via a cable, the first interface configured to receive an audio signal from the source device;

at least one speaker coupled to the first interface for outputting the audio signal as sound; and a circuit coupled between the first interface and the at least one speaker, the circuit configured to impede harmonic distortion generated at the speaker, intermodulation distortion generated at the speaker, and environmental noise captured by the speaker from feeding back into the source device over the cable.

15. The device as recited in claim 14, wherein the circuit is further configured to remove frequencies from the audio signal above a predetermined threshold prior to the speaker outputting the audio signal as sound.

16. The device as recited in claim 15, wherein the predetermined threshold is about 20 kHz.

17. The device as recited in claim 15, wherein the predetermined threshold is set based at least in part on frequency introduced into the audio signal by the source device.

18. The device as recited in claim 15, wherein the frequencies removed from the audio signal are ultrasonic frequencies.

19. The device as recited in claim 14, wherein the circuit has an inductance selected based in part on an impedance of the speaker.

20. The device as recited in claim 19, wherein the inductance of the circuit assists in preventing the harmonic distortion, intermodulation distortion, and environmental noise feeding back into the source device.

* * * * *